Figure 1:
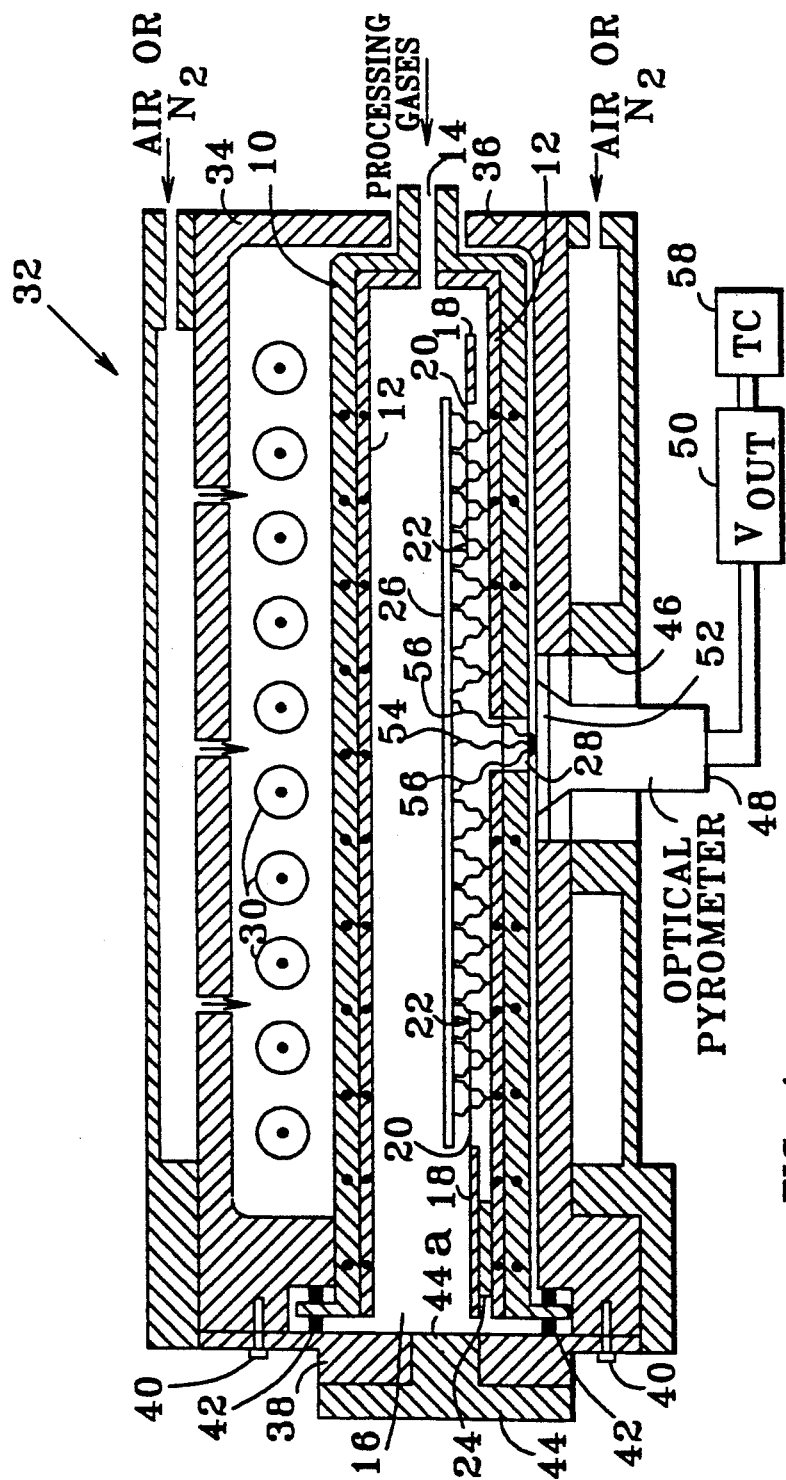

United States Patent [19]

Nakos et al.

[11] Patent Number: 5,226,732
[45] Date of Patent: Jul. 13, 1993

[54] EMISSIVITY INDEPENDENT TEMPERATURE MEASUREMENT SYSTEMS

[75] Inventors: James S. Nakos, Essex; Paul E. Bakeman, Jr., South Burlington; Dale P. Hallock, Bristol; Jerome B. Lasky, Essex Junction; Scott L. Pennington, South Burlington, all of Vt.

[73] Assignee: International Business Machines Corporation, Armonk, N.Y.

[21] Appl. No.: 876,722

[22] Filed: Apr. 17, 1992

[51] Int. Cl.⁵ .............................. G01J 5/06; G01J 5/02
[52] U.S. Cl. ..................................... 374/133; 374/126; 250/338.1
[58] Field of Search ............... 374/123, 126, 127, 128, 374/133; 356/45; 250/338.1, 341

[56] References Cited

U.S. PATENT DOCUMENTS

| | | | |
|---|---|---|---|
| 3,581,570 | 6/1971 | Wortz | 374/130 |
| 4,144,758 | 3/1979 | Roney | 374/126 |
| 4,408,878 | 10/1983 | Fischbach | 356/43 |
| 4,854,727 | 8/1989 | Pecot et al. | 374/57 |
| 4,919,542 | 4/1990 | Nulman et al. | 374/133 |
| 4,923,772 | 5/1990 | Kirch et al. | 156/626 |
| 4,979,134 | 12/1990 | Arima et al. | 374/126 |
| 4,989,991 | 2/1991 | Pecot et al. | 374/133 |
| 5,061,084 | 10/1991 | Thompson et al. | 374/127 |
| 5,098,195 | 3/1992 | Halyo et al. | 374/9 |
| 5,098,198 | 3/1992 | Nulman et al. | 374/126 |
| 5,114,242 | 5/1992 | Gat et al. | 374/128 |

FOREIGN PATENT DOCUMENTS

| | | | |
|---|---|---|---|
| 0131523 | 8/1983 | Japan | 374/126 |
| 0167929 | 10/1983 | Japan | 374/126 |
| 0171643 | 10/1983 | Japan | 374/126 |
| 0253939 | 12/1985 | Japan | 374/133 |
| 0130834 | 6/1986 | Japan | 374/133 |
| 2082767 | 3/1982 | United Kingdom | 374/128 |

OTHER PUBLICATIONS

"Emissivity issues in pyrometric temperature monitoring for RTP system" by J. Nulman, SPIE vol. 1189 Rapid Isothermal Processing (1989), pp. 72 to 82.

"Pyrometry Emissivity Measurements and Compensation in an RTP Chamber" by J. Nulman et al, Materials Research Society Symposium Proceedings, 1989, vol. 146, pp. 461 to 466.

"A double-wedge reflector for emissivity enhanced pyrometry" by J. C. Krapez et al, National Research Council Canada, Industrial Materials Research Institute, 1990, pp. 857 to 864.

"Reflecting-cavity IR temperature sensors: an analysis of spherical, conical and double-wedge geometries" by J. C. Krapez et al, SPIE, vol. 1320, Infrared Technology and Applications, 1990, pp. 186 to 201.

"Infrared Temperature Measurement with Automatic Correction of the Influence of Emissivity" by V. Tank, Infrared Physics, vol. 29, No. 2-4, 1989, pp. 211 to 212.

*Principles of Optics*, by M. Born et al, A Pergamon Press Book, 1964, pp. 51 to 70.

Primary Examiner—William A. Cuchlinski, Jr.
Assistant Examiner—Diego F. F. Gutierrez
Attorney, Agent, or Firm—Stephen J. Limanek; Mark F. Chadurjian

[57] ABSTRACT

An improved contactless temperature measurement system is provided which includes a workpiece, a chamber containing the workpiece with the walls thereof being substantially transmissive to radiation at wavelengths other than a given wavelength and substantially reflective at the given wavelength to remove the dependence of the apparent or measured temperature on the workpiece emissivity variations or fluctuations.

20 Claims, 3 Drawing Sheets

EMISSIVITY INDEPENDENT TEMPERATURE MEASUREMENT SYSTEMS

DESCRIPTION

1. Technical Field

This invention relates to emissivity independent optical pyrometry temperature measurement systems which allow processing of a workpiece using contactless pyrometry by removing the dependence of apparent or measured temperature on the workpiece emissivity variations or fluctuations.

2. Background Art

Optical pyrometry is a well known method of obtaining information about the temperature of a workpiece, such as a semiconductor, e.g., silicon, wafer, in a contactless manner, particularly in rapid thermal processing systems. However, known optical pyrometry methods have the limitation that the measurement value obtained by the optical pyrometer is modified by the emissivity of the workpiece or wafer, i.e., the intensity $I_p$ incident on the optical pyrometer is equal to the emissivity $E_w$ of the workpiece or wafer times the intensity $I_{bb}$ of a black body at a particular wavelength, or integrated over the band of wavelengths to which the pyrometer is sensitive, and temperature, i.e., $$I_p = (E_w)(I_{bb}). \tag{1}$$

In many cases the emissivity is not well known, severely limiting the utility or value of this temperature measuring technique. For semiconductor wafer processing, the difference in emissivity from wafer to wafer may result from, e.g., a variation in film thicknesses which are within acceptable processing specifications. Such a variation can result in an unacceptable error in the pyrometrically measured temperature, e.g., the temperature variation may be 100° C. or more. Such an effect also limits the use of optical pyrometry in chemical vapor deposition applications since as the layers are deposited the emissivity of the wafer changes and as a result the temperature cannot be readily controlled.

Furthermore, in the case of semiconductor wafer processing, the intensity observed by the optical pyrometer is modified by the chamber in which the processing takes place since much of the radiation from the wafer is reflected one or more times by the chamber which usually has one or more walls arranged approximately parallel to and spaced from the major surfaces of the wafer. It should be noted that an infinite series of rays can be identified which have increasing numbers of reflections from the walls of the chamber and the wafer. Thus, the total intensity of the radiation received in the optical pyrometer is $$I_p = (E_w)(I_{bb}[1 + R_{ch}R_w + (R_{ch}R_w)^2 + \ldots ]), \tag{2}$$

where $R_{ch}$ is the reflectivity of the chamber and $R_w$ is the reflectivity of the wafer at a particular wavelength and temperature. It should be noted that the infinite geometric series within the brackets simplifies to $$1/(1 - R_{ch}R_w). \tag{3}$$

The prior art discusses rapid thermal processing systems and relationships between wafer emissivity and the reflectance of the chamber, e.g., in an article entitled "Emissivity issues in pyrometric temperature monitoring for RTP system" by J. Nulman, SPIE Vol. 1189 Rapid Isothermal Processing (1989), pages 72 to 82, and in an article entitled "Pyrometry Emissivity Measurements and Compensation in an RTP Chamber" by J. Nulman et al, Materials Research Society Symposium Proceedings, 1989, Vol. 146, pages 461 to 466. An article entitled "A double-wedge reflector for emissivity enhanced pyrometry" by J. C. Krapez et al, National Research Council Canada, Industrial Materials Research Institute, 1990, pages 857 to 864, discloses the use of a double-wedge cavity configuration to increase the equivalent emissivity of a metal sheet and a hemispheric reflective cavity in close proximity to a workpiece to act as a near-blackbody so that the effective emissivity is increased. An article entitled "Reflecting-cavity IR temperature sensors: an analysis of spherical, conical and double-wedge geometries" by J. C. Karpez et al, SPIE, Vol. 1320, Infrared Technology and Applications, 1990, pages 186 to 201, discusses the increased use of reflective cavity pyrometers for on-line temperature sensing of metal sheets. A method of determining the temperature of metals in which the influence of the emissivity is corrected is disclosed in "Infrared Temperature Measurement with Automatic Correction of the Influence of Emissivity" by V. Tank, Infrared Physics, Vol. 29, No. 2-4, 1989, pages 211 to 212. A discussion of reflection of radiant energy by the use of multi-layer films may be found in *Principles of Optics*, by M. Born et al, A Pergamon Press Book, 1964, pages 51 to 70.

Pyrometers and emissivity measurements of remote, heated semiconductor wafers or other workpieces is discussed in U.S. Pat. No. 4,408,878, issued Oct. 11, 1983, entitled "Method and Apparatus for Measuring Emissivity", U.S. Pat. No. 4,854,727, issued Aug. 8, 1989, entitled "Emissivity Calibration Apparatus and Method" and U.S. Pat. No. 4,919,542, issued Apr. 24, 1990, entitled "Emissivity Correction Apparatus and Method".

DISCLOSURE OF THE INVENTION

It is an object of this invention to provide a contactless temperature measurement system which allows processing of a workpiece, such as a semiconductor wafer, by removing the dependence of apparent or measured temperature on the workpiece or wafer emissivity or variations or fluctuations of emissivity.

In accordance with the teachings of this invention, an improved contactless temperature measurement system is provided which includes a workpiece having a substantially flat surface, a chamber containing the workpiece having a substantially flat wall arranged substantially parallel to and spaced from the flat surface, the flat wall being substantially transmissive to radiation at wavelengths and substantially reflective at the given wavelength or range of wavelengths and an optical pyrometer disposed to detect radiation from the workpiece at substantially only the given wavelength or range of wavelengths to remove the dependence of the apparent or measured temperature on workpiece emissivity or emissivity variations or fluctuations.

The foregoing and other objects, features and advantages of the invention will be apparent from the following more particular description of the preferred embodiments of the invention, as illustrated in the accompanying drawings.

BRIEF DESCRIPTION OF THE INVENTION

Figure 2:
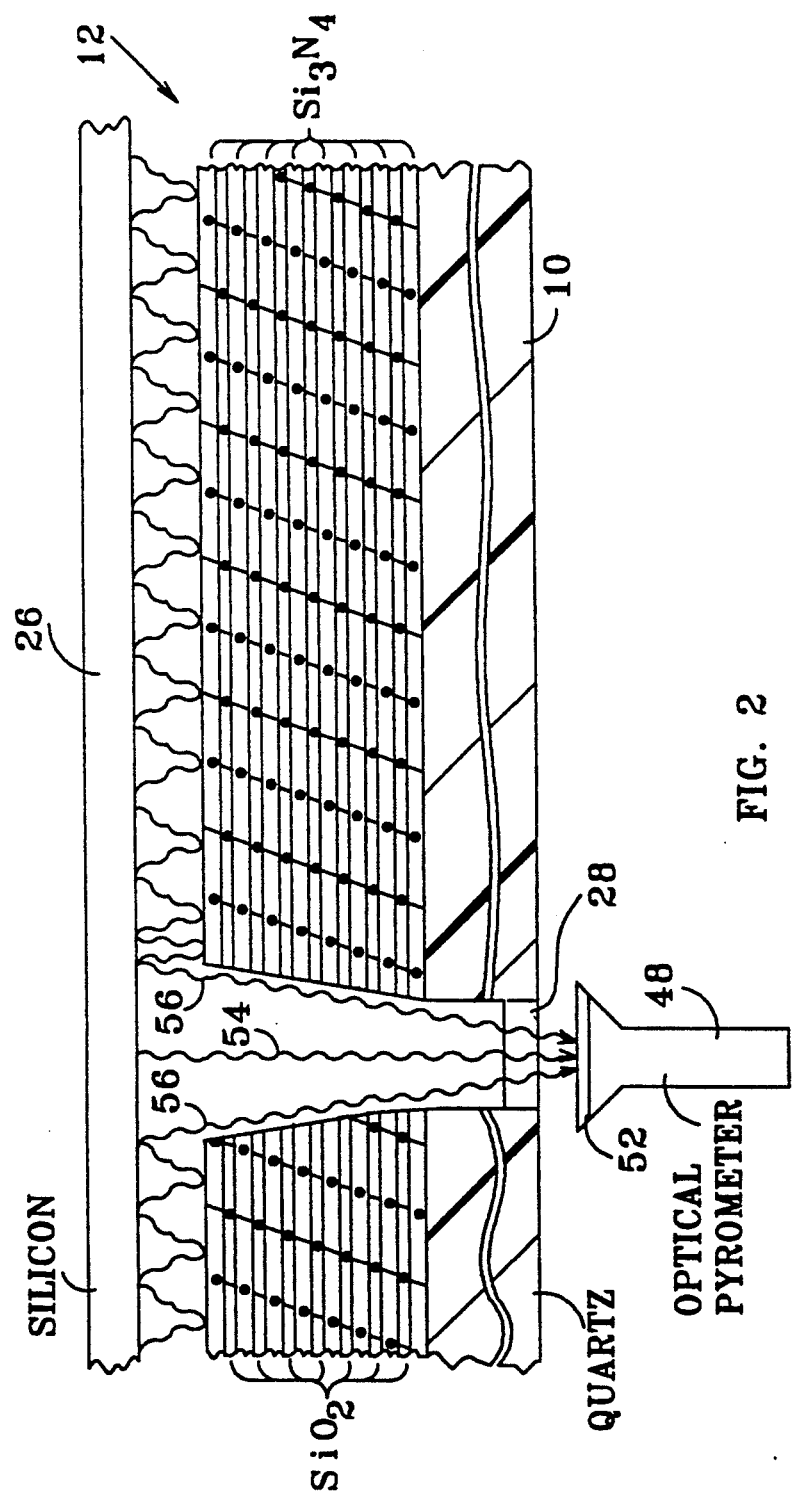
Figure 3:
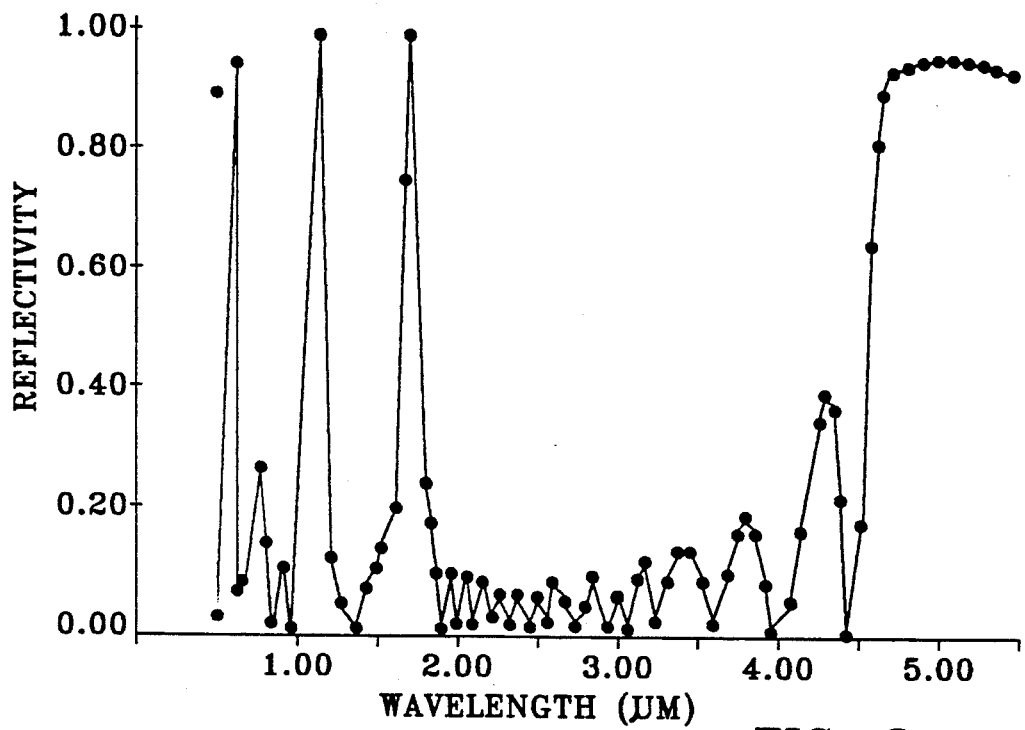
Figure 4:
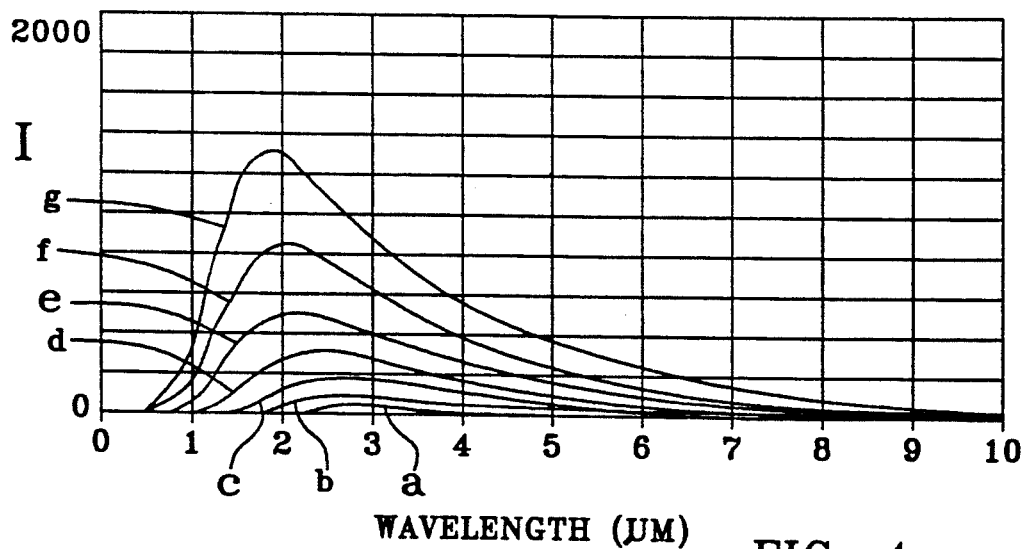

FIG. 1 is a contactless temperature measurement system including a chamber illustrated primarily in cross-sectional view in accordance with the teachings of an embodiment of the present invention, FIG. 2 illustrates in more detail the cross-sectional view of walls of the chamber shown in FIG. 1, FIG. 3 is a graph illustrating the reflectivity of the walls of the chamber shown in FIGS. 1 and 2 as a function of wavelength, and FIG. 4 shows theoretical typical black body curves with intensity plotted against wavelengths at various temperatures.

BEST MODE FOR CARRYING OUT THE INVENTION

Referring to FIG. 1 of the drawings in more detail, there is illustrated primarily in cross-sectional view the contactless temperature measurement system of the present invention which includes a processing chamber 10 preferably made of quartz having a highly reflective multi-layer film 12 disposed preferably on the inner surface thereof. Such chambers are often referred to as rapid thermal anneal or process chambers. The multi-layer film 12 is shown and described herein in more detail in connection with FIG. 2 of the drawings. The processing chamber 10 includes at one end thereof a port 14 through which any desired processing gases, either inert or reactive gases, may be introduced into the chamber 10, with the other end of the chamber 10 having a wide opening 16 so as to facilitate the insertion of a workpiece such as a wafer into the interior of the chamber 10. A quartz tray 18 having at least three support pins 20, only two of which are illustrated, each with upright needle-like support bases 22, is attached to the lower portion of the chamber 10 by welding or by any suitable pin 24. A semiconductor wafer 26, preferably made of silicon, is shown within the chamber 10 resting on the needle-like support bases 22. The chamber 10 also includes a segment 28 which is transparent to radiation over at least the wavelength range for which the pyrometer is sensitive and does not include the multi-layer film 12.

A plurality of tungsten-halogen lamps 30 having quartz tubes are disposed over and in the proximity of the processing chamber 10 to provide heat to the workpiece 26. The lamps 30 are arranged parallel to each other with their axes perpendicular to the sheet of the paper. Although the lamps 30 are shown only as being located above the chamber 10, it should be understood that, if desired, additional lamps may be provided in the same manner below the chamber 10. A cooling gas distribution system 32 having an upper segment 34 and a lower segment 36, made preferably of stainless steel, is provided in which the processing chamber 10 and lamps 30 are housed. Air or nitrogen may be introduced into the system 32 for cooling purposes. Also, if desired, as is known, water may be circulated through holes (not shown) within the stainless steel segments 34 and 36 to provide further cooling to the system 32. A first end piece 38 is secured to the cooling gas distribution system 32 by a plurality of bolts 40 so as to be able to readily remove the processing chamber 10 for cleaning and repair or replacement and to provide a seal with O-rings 42 between the inside of the processing chamber 10 and the cooling gas distribution system 32. A second end piece 44, secured to the first end piece 38, provides a seal between the inside of the chamber 10 and the outside environment and also access to the inside of the chamber 10 for insertion or removal of the wafer 26. The first and second end pieces 38, and 44, respectively, are also preferably made of stainless steel, with the surface 44a of the second end piece 44 exposed to the interior of the processing chamber 10 having a polished, highly reflective surface, or, if desired, the surface 44a may also be covered with the highly reflective multi-layer film 12.

An opening 46 is provided in the lower segment 36 of the cooling gas distribution system 32 to receive an optical pyrometer 48, having an output Vout shown at 50, disposed to intercept radiation from the surface of the wafer 26 passing through the transparent segment 28 of the processing chamber 10. It should be noted that this segment 28 is very small with respect to the dimensions of the workpiece 26 and chamber 10 and results in only a minor perturbation. A narrow band optical filter 52, having a range, e.g., from about 4.5 to 5.5 microns, is located between the optical pyrometer 48 and the transparent segment 28 of the processing chamber 10. The pyrometer 48 may be of any suitable type, such as those using lead selenium, Pb Se, or mercury cadmium tellurium, Hg Cd Te, responsive to wavelengths for which the chamber 10 is highly reflective. Direct electromagnetic radiation 54 and reflected electromagnetic radiations 56 from the surface of the wafer 26 are shown being introduced into the optical pyrometer 48 through the narrow band optical filter 52. Any suitable temperature control circuit 58 may be connected to the output Vout 50 of the optical pyrometer 48 to control the heat generated by the tungsten-halogen lamps 30.

FIG. 2 illustrates in more detail, on an an enlarged scale, the highly reflective multi-layer film 12 indicated in FIG. 1 of the drawings. As can be seen in FIG. 2, the multi-layer film 12, spaced approximately 10 millimeters from the wafer 26, includes 15 thin dielectric layers disposed on the inside of the quartz chamber 10 with eight of the layers being made of silicon nitride, $Si_3N_4$, and seven of the layers being made of silicon dioxide, $SiO_2$. The quartz walls of the chamber 10 are typically three millimeters thick. The two different types of layers are arranged alternately with the layer adjacent to the quartz chamber 10 being silicon nitride, as indicated in FIG. 2. Each silicon nitride layer has a thickness of 6250 angstroms and each silicon dioxide layer has a thickness of 8741 angstroms so that the multi-layer film 12 provides substantially 100% reflectivity for radiation emanating from the surface of the wafer 26 which has a wavelength between about 4.5 and 5.5 microns. If a pyrometer sensitive to wavelengths other than those mentioned hereinabove is used, the thicknesses of each of the dielectric layers of the multi-layer film 12 would be adjusted in a known manner to obtain substantially 100% reflectivity at those other wavelengths.

In FIG. 3 there is shown a graph which indicates the reflectivity as a function of the wavelength in microns of the multi-layer film 12 illustrated in FIGS. 1 and 2 of the drawings. It can be seen that for pyrometers having a wavelength band of 4.5 to 5.5 microns the reflectivity is approximately 1, i.e., 100%. It should also be noted that quartz is opaque at wavelengths longer than 5.5 microns.

The theoretical typical black body curves are shown in FIG. 4 of the drawings with intensity I which is expressed in arbitrary units plotted against wavelength in microns for various temperatures. Curve a is plotted for a temperature of 750°, curve b for 875°, curve c for 1000°, curve d for 1125°, curve e for 1250°, curve f for 1375° and curve g for 1500° Kelvin. These curves follow the black body equation $$I(\text{lambda}, T) = \frac{(2)(\text{pi})(c^2)(h)}{[\text{lambda}]^5 (\text{exponent}((c)(h)/((\text{lambda})(k)(T))) - 1)}, \quad (4)$$

where I is the monochromatic emissive power, lambda is the wavelength, T is the temperature, c is the speed of light, h is Planck's constant and k is Boltzmann's constant.

In the operation of the contactless temperature measurement system of the present invention, as shown in FIGS. 1 and 2 of the drawings, the wafer 26 is disposed in the process chamber 10 to be heated at a particular temperature by the tungsten-halogen lamps 30. The lamps 30 radiate a wide band of radiation or multifrequency radiation most of which readily passes through the quartz walls of the processing chamber 10 and the multi-layer thin film 12 to heat the wafer 26. As the wafer 26 is heated, various amounts of radiation emanate from the wafer 26 and pass directly to the filter 52, as in the case of the ray 54, or are reflected one or more times between the multi-layer film 12 and the wafer 26, as in the case of the rays 56, before passing to the filter 52. Since the filter 52 is a narrow band filter which permits rays having wavelengths of only 4.5 to 5.5 microns to pass to the optical pyrometer 48, the pyrometer 48 need be sensitive to wavelengths of only 4.5 to 5.5 microns. With the rays having wavelengths between 4.5 and 5.5 microns being reflected substantially nearly 100% by the multi-layer film 12 on the chamber surface, as indicated in the graph of FIG. 3 of the drawings, the optical pyrometer 48 detects only the black body radiation from the wafer 26, with the emissivity of the wafer being of little or no importance in the pyrometer reading. This effect is described hereinbelow.

Although the emissivity is generally a factor when an optical pyrometer detects the intensity I as indicated hereinabove in equation (1), it should be noted that with the silicon wafer 26 being opaque, having a thickness of approximately 625 microns, above 750° C. and under steady state conditions, the emissivity $E_w$ at a particular wavelength is approximately $$E_w = 1 - R_w, \quad (5)$$

according to Kirchhoff's law, where $R_w$ is the reflectivity of the wafer. Substituting the simplified geometric series (3) in to equation (2) and also using equation (5) therein, equation (2) is rewritten as $$I_p = (1 - R_w)/I_{bb}/(1 - R_{ch}R_w), \quad (6)$$

where $I_{bb}$ is the black body intensity and $R_{ch}$ is the reflectivity of the chamber or multi-layer film 12. Since the reflectivity $R_{ch}$ of the interior of the chamber 10 is nearly 100%, i.e., 1, equation (6) then reduces to $$I_p = I_{bb}. \quad (7)$$

Thus, the intensity recorded by the optical pyrometer 48 is equal to the intensity of the black body radiation of the wafer 26.

Now it can be seen that by referring to the black body radiation curves at 5+/−0.5 microns in FIG. 4 of the drawings the temperature of the wafer 26 can be readily determined in an accurate and contactless manner. Of course, the pyrometer 48 should first be calibrated by any suitable means such as by using a test wafer with a thermocouple.

Although FIGS. 2 and 3 disclose the use of 15 dielectric layers to obtain substantially 100% reflectivity at the inside surface of the processing chamber 10, it should be understood that when less accurate temperature readings can be tolerated, only 7 or 9 of the silicon nitride and silicon dioxide layers need be used which can provide a reflectivity of 90 or more percent. Also, it should be understood that, as is known, materials other than silicon nitride and silicon dioxide, e.g., dielectrics such as titanium oxide, vanadium oxide or chromium oxide, may be used to provide highly reflective surfaces in the interior of the processing chamber 10. It should be noted further that due to the nature of black body radiation the sharp peaks seen at 0.50, 1.00 and 1.70 microns in the reflectivity curve of FIG. 3 of the drawings are negligible as far as energy transfer to wafer 16 is concerned. Also, even though the ends of the process chamber 10 may not be completely tuned to the selected narrow band of radiation, these areas are small compared with the area of the interior surfaces of the typical chamber 10 that are covered with the highly reflecting multi-layer film 12 and, therefore, very little error is introduced by the ends of the chamber 10. However, if desired, the surface 44a of the second end piece 44 may be made highly reflective by polishing or by application of the film 12 thereto to further enhance the reflectivity in the chamber 10.

It should be noted that the transparent element 28 shown in FIGS. 1 and 2 of the drawings through which the reflected rays 56 and ray 54 pass before entering into the optical pyrometer 48 may be an optical lens. If a lens is used for the transparent element 28, then an optical stop may be added which is situated in the back focal plane of the lens in such a manner as to block the forward scattered rays. Thus, the component of radiation which does not contain a substantial contribution of reflected radiation, such as ray 54 indicated in FIGS. 1 and 2 of the drawings, is blocked from entering the pyrometer 48. This technique is analogous to known dark field optical microscopy.

Accordingly, it can be seen that an improved contactless temperature measurement system has been provided wherein the processing chamber is tuned to be reflective in a selected narrow band with the optical pyrometer adapted to receive only the radiation from within the selected narrow band. Such an arrangement permits heating the wafer 26 from outside the processing chamber 10 by the heating source, i.e., the tungsten-halogen lamps 30, while eliminating the effect of wafer emissivity on the measured temperature. This tuned reflectivity cancels out workpiece emissivity variations or differences between workpieces to significantly enhance the accuracy of optical pyrometric temperature measurements. Thus, an accurate contactless temperature measurement system is provided in accordance with the teachings of this invention without the need for complicated and variable calibration procedures.

While the invention has been particularly shown and described with reference to preferred embodiments thereof, it will be understood by those skilled in the art that various changes in the form and details may be made therein without departing from the spirit and scope of the invention.

What is claimed is:

1. A system comprising
   a chamber having substantially all walls made of first material and a film disposed on said first material transparent to a broad band of electromagnetic radiation and highly reflective at a given narrow band of electromagnetic radiation, said walls having a small segment thereof made of second material transparent to said given narrow band of radiation,
   a workpiece disposed within said chamber and spaced from the walls thereof,
   heat source means arranged outside said walls for producing the broad band of radiation and for directing same through said first material and said film to said workpiece, and
   optical pyrometer means adapted to receive from said small segment only said given narrow band of radiation.

2. A system as set forth in claim 1 wherein said film includes a dielectric film.

3. A system as set forth in claim 2 wherein said dielectric film is a multi-layer film.

4. A system as set forth in claim 3 wherein said multi-layer film is an oxide-nitride film.

5. A system as set forth in claim 4 wherein said oxide-nitride film includes eight layers of silicon nitride and seven layers of silicon dioxide.

6. A system as set forth in claim 5 wherein said first material includes a layer of quartz supporting said oxide-nitride film, said silicon nitride and silicon dioxide layers being arranged alternately in a stack with one of said silicon nitride layers being contiguous to said layer of quartz.

7. A system as set forth in claim 1 wherein said optical pyrometer means includes a filter tuned to said given narrow band of electromagnetic radiation and said small segment includes an optical lens.

8. A system as set forth in claim 7 wherein said heat source means includes a plurality of lamps disposed adjacent to said chamber.

9. A system as set forth in claim 8 wherein each of said lamps are tungsten-halogen lamps.

10. A system as set forth in claim 9 wherein said workpiece is a semiconductor wafer.

11. A contactless temperature measurement system comprising
    a chamber having walls made of quartz and a film disposed on said quartz tuned to be reflective at a given band of wavelengths of electromagnetic radiation, said walls and said film being transmissive of radiation at other wavelengths and said chamber having a segment thereof transparent to said radiation of given band of wavelengths,
    a workpiece disposed within said chamber and spaced from said walls and film,
    heat source means disposed adjacent to and outside of said chamber for generation radiation of said other wavelengths and directing said other radiation to said workpiece through said walls and film,
    an optical pyrometer disposed to receive from said segment said radiation of given band of wavelengths, and
    an optical filter tuned to said radiation at given band of wavelengths and disposed between said segment of said chamber and said optical pyrometer.

12. A contactless temperature measurement system as set forth in claim 11 wherein said film is a dielectric film.

13. A contactless temperature measurement system as set forth in claim 12 wherein said film is a multi-layer film.

14. A contactless temperature measurement system as set forth in claim 13 wherein said film is an oxide-nitride film.

15. A contactless temperature measurement system as set forth in claim 14 wherein said film includes eight layers of silicon nitride and seven layers of silicon dioxide, said silicon nitride and silicon oxide layers being alternately arranged in a stack with one of said silicon nitride layers being contiguous to said quartz.

16. A contactless temperature measurement system as set forth in claim 11 wherein said workpiece is a semiconductor wafer made of silicon.

17. A contactless temperature measurement system as set forth in claim 16 wherein said heat source means includes a plurality of lamps.

18. A system comprising
    a chamber,
    a workpiece disposed in said chamber,
    heating means for applying multifrequency radiation to said workpiece,
    an optical pyrometer disposed to receive radiation from said workpiece at a band of wavelengths centered at a wavelength A, and
    a member disposed within said chamber proximate to said workpiece that is substantially transmissive to radiation at wavelengths other than said band of wavelengths centered at a wavelength A and is substantially reflective at said band of wavelengths centered at a wavelength A, said member including a segment transparent to said radiation at a band of wavelengths centered at a wavelength A and said optical pyrometer being further disposed to receive from said segment said radiation at a band of wavelengths centered at a wavelength A.

19. A system as set forth in claim 18 wherein said member is a dielectric film and said heating means include a plurality of lamps.

20. A system as set forth in claim 19 wherein said dielectric film is a multi-layer film made of silicon nitride and silicon dioxide and said workpiece is a semiconductor wafer.

* * * * *